Aug. 25, 1953  J. A. HJULIAN ET AL  2,650,059
FILLING VALVE OR THE LIKE
Filed April 18, 1950  2 Sheets-Sheet 2
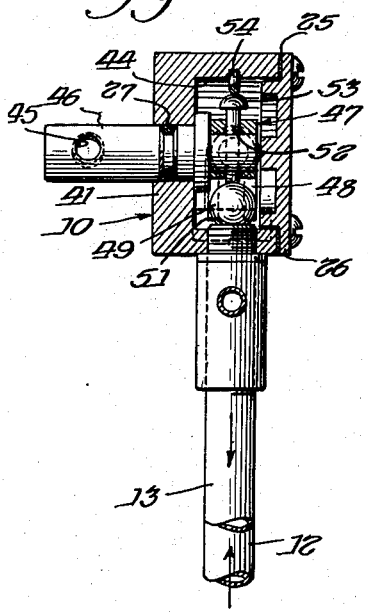
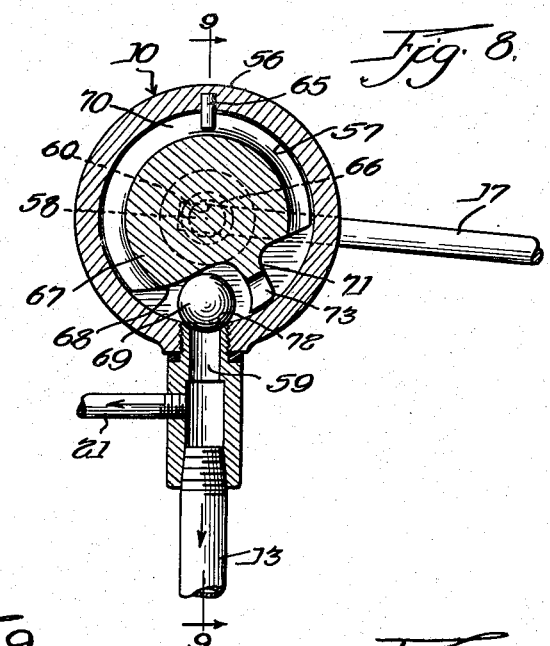
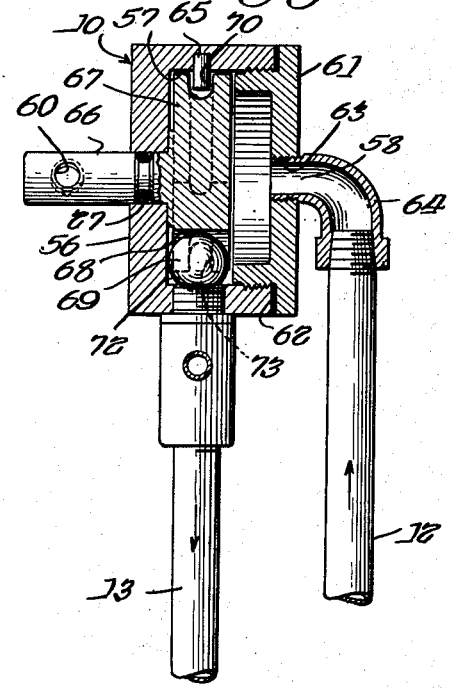
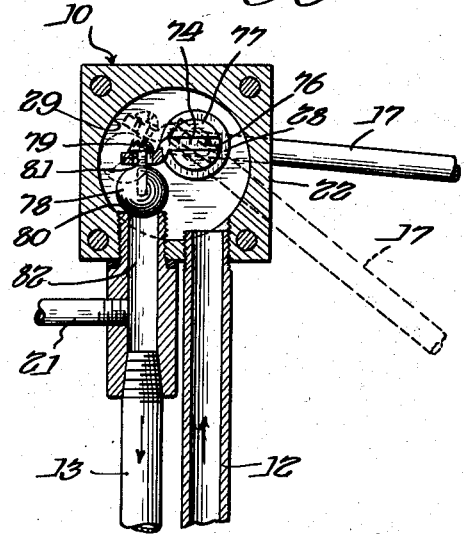
Inventors,
Julius A. Hjulian,
Frank D. Cotterman, &
George E. Hansen.
By Joseph O. Lange
Atty.

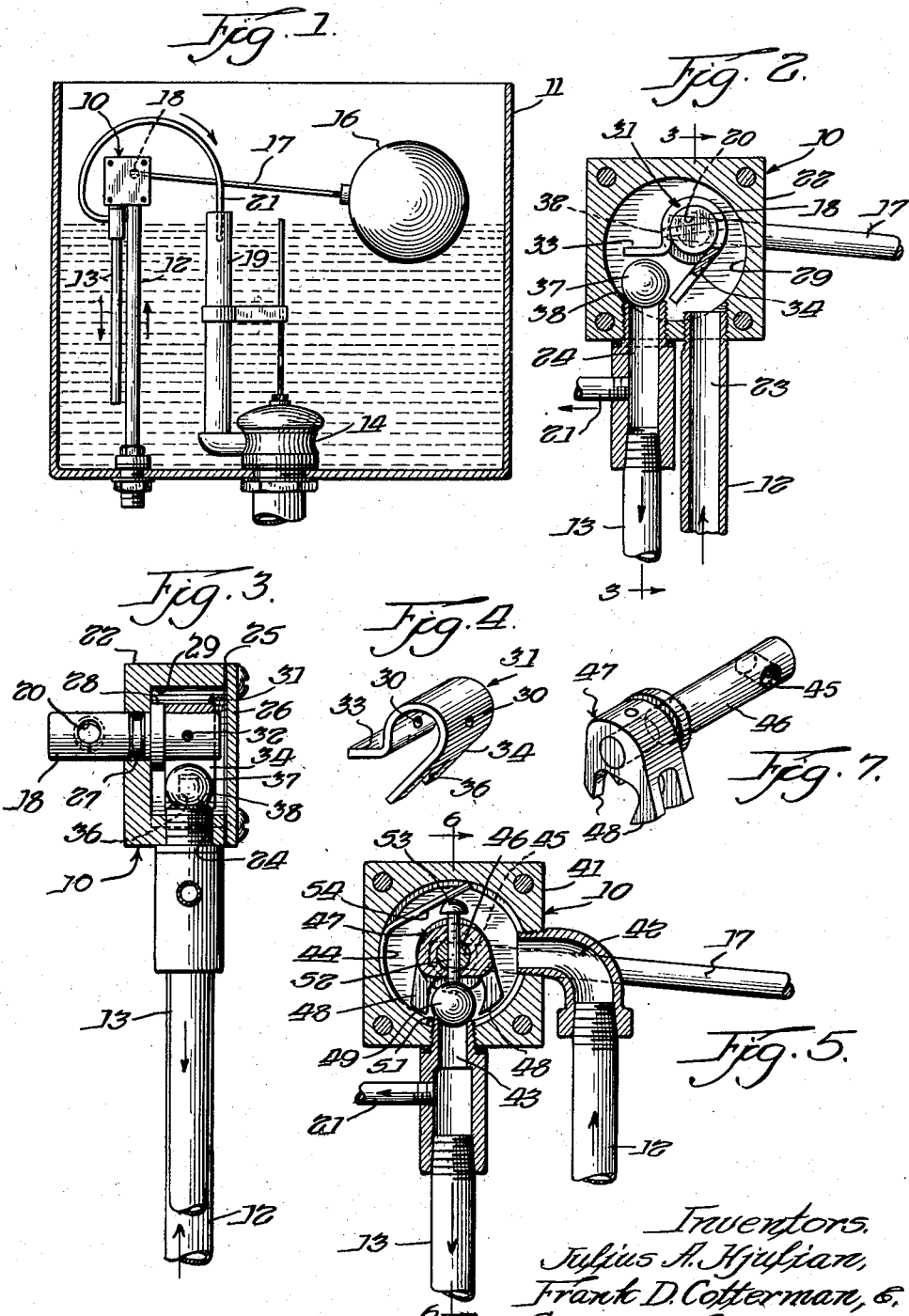

Patented Aug. 25, 1953

2,650,059

UNITED STATES PATENT OFFICE 2,650,059

FILLING VALVE OR THE LIKE

Julius A. Hjulian, Palos Heights, Frank D. Cotterman, La Grange, and George E. Hansen, Chicago, Ill., assignors to Crane Co., Chicago, Ill., a corporation Application April 18, 1950, Serial No. 156,684

4 Claims. (Cl. 251—133)

This invention pertains to filling valves or the like. More specifically, this invention relates to the type of valve such as a ball cock valve, the latter being normally actuated by a float and lever arrangement and is preferably used to control liquid flow into a tank or similar vessel.

Thus, it is one of the more important objects of this invention to provide a comparatively simple and economical valve which will accurately control liquid flow therethrough.

Another object of this invention is to provide a ball cock type of valve which will easily control fluid flow into a tank with a plurality of seating contacts on the movable closure for a single seat.

It is a further object of this invention to provide a sturdy and positively operating valve of the floating closure member type, thereby to maintain the advantages of a self-sealing closure member while still providing effective means for seating the said closure member.

Another object is to provide a floating closure member type of valve which is outstandingly simple in construction and in its operation, thus minimizing the number of moving parts subjected to wear and providing for improved operational characteristics.

Still another object is to provide a floating closure member type of valve which is not only economical to manufacture, but equally cheap to maintain in service.

Another object is to provide a valve which will be adaptable to seat the closure member of the valve on either the valve inlet opening or outlet opening.

Other objects and advantages will become more readily apparent upon proceeding with the following description read in light of the accompanying drawings, in which:

Fig. 1 is an elevation assembly view showing a preferred form of application of the type of valve forming the subject matter of this invention as hereinafter described.

Fig. 2 is a fragmentary sectional view of the embodiment of this invention referred to in Fig. 1.

Fig. 3 is a fragmentary sectional view taken on the line 3—3 of Fig. 2.

Fig. 4 is a perspective view of the closure member holder shown in Fig. 2.

Fig. 5 is a view showing a modified form of the invention.

Fig. 6 is a sectional view taken on the line 6—6 of Fig. 5.

Fig. 7 is a perspective view of the modified closure member holder and stem referred to above in Fig. 5.

Fig. 8 is a fragmentary sectional view showing a further modification of the invention.

Fig. 9 is a sectional view taken on the line 9—9 of Fig. 8.

Fig. 10 is a view of another modification of the invention.

Similar reference numerals refer to similar parts throughout the several views.

As shown in Fig. 1, the valve with which this invention is concerned and generally referred to by reference numeral 10 is preferably mounted within a tank 11 having a fluid inlet 12 communicating with the valve 10 and having a fluid outlet 13 therefrom discharging into the tank 11. The inlet 12 is connected in the usual manner to an external source of fluid or liquid supply (not shown). The valve 10 may be actuated by a ball float 16 suspended within a liquid and connected to the valve 10 by means of a lever 17, the latter member being pinned to the rotatable stem 18 journalled within the valve 10. The usual ball cock principle, as above roughly described, thus has the advantage of automatically regulating the level or the amount of liquid contained within the tank 11. However, it should be clear that actuation of the valve 10 may also be obtained by any suitable means which will impart the desired rotation to the stem 18. Discharge means for releasing the fluid from within the tank 11 may be that of a simple closure member, such as the kind referred to by those skilled in the art as a Douglas valve superposed over an opening in the tank 11, as designated by the reference numeral 14. An overflow pipe 19 may be arranged within the tank 11 and thereby safeguard against overflow or flooding of the said tank. A fixture refill pipe 21 may be connected with the valve outlet 13 for supply of a liquid seal to a fixture (not shown).

The foregoing description may be common to a variety of installations concerning specific embodiments of the general type of valve pertaining to this invention.

As shown more clearly in Figs. 2 and 3, the valve 10, threadedly mounted on the fluid inlet pipe 12, consists of a substantially fluid tight body or casing 22 having fluid inlet 23 and outlet 24 openings threaded into the casing 22 to permit flow therethrough. One side of the casing 22 has a removable cover 26 and preferably a gasket 25 positioned therebetween. The opposite side of the casing is arranged to allow for the rotatable stem 18 to extend therethrough.

Between the stem 18 and the casing 22, a seal may be provided with an O-ring 27 positioned to insure fluid tightness with the casing 22, as shown in Fig. 3. An annular stem shoulder 28 inside the casing 22 will prevent tilting and sticking of the stem 18 which extends through the casing 22 to abut the inner surface of the casing cover 26, as illustrated. It will be noted in Fig. 2 that the casing 22 has a chamber 29 which may be a circular recess and in relation to which the stem 18 is predeterminately positioned eccentrically, thereby to assist in maintaining greater compactness of the valve.

To aid in the actuation of the valve, a closure member holder 31 is formed around a portion of the length of the stem 18, and is relatively non-rotatably secured thereto by means of the pin 32. Two spaced-apart end portions 33 and 34 of the closure member holder 31 normally extend in the general direction of the casing outlet 24 with the end portion 33 having a predetermined bend shown, and the portion 34 being formed substantially straight (see Figs. 2 and 4) for reasons hereinafter made clear. The closure member holder 31 is provided with a relieved or cut-out section 36 in the straight end portion 34 to facilitate control of the fluid flow from the inlet 23 to the outlet 24 in the open position of the valve 10. A closure member preferably in the form of the ball 37 is freely disposed between the end portions 33 and 34 of the closure member holder 31, and thus serves as the closure member to be operable over the casing outlet 24 which is formed with a suitable seat 38 to receive it upon predetermined movement.

Thus, with the foregoing structure in mind, it should be easily understood that the buoyant float 16, responding to fluid level changes within the tank 11, actuates the lever 17 received in the hole 20 and which in turn rotates the stem 18 together with the closure member holder 31 in a counterclockwise manner (relative to Fig. 2), whereby the latter member influences the position of the ball 37 relative to the respective inlet and outlet openings 23 and 24. The ball 37 is arranged to operate over the casing outlet 24. Due to the effect of fluid flow through the valve 10, and upon predetermined pivotal movement of the lever 17 and rotation of the stem 18 and holder 31, the ball 37 is self-seating relative to 38 when the liquid in the tank reaches a predetermined level. As apparent in Fig. 2, relatively slight further rotation of the closure member holder 31 will effect a positive closing by reason of the force exerted by the bent end portion or angular extension 33 of the member 31 in pressing the ball 37 downwardly and directly onto the outlet seat 38. As the tank 11 empties and the float 16 drops, the resultant clockwise and reversed rotation of the holder member 31, and particularly having in mind the movement of the end portion 34, the ball 37 will be brushed aside and away from the seat 38, thereby to allow the liquid to flow through the valve 10. The subsequent course of travel of the ball will then follow the inner arcuate peripheral surface of the chamber 29.

It should, of course, be understood that conversely the ball 37 may be made to move over the valve inlet 23 as well as the outlet 24 by virtue of the positive means available for seating the ball 37. Thus, if the flow through the valve 10 shown in Fig. 2 were reversed, the valve 10 could easily be made to control the said flow therethrough.

In summation of the foregoing, it will be apparent this invention provides three distinct means for interrupting the flow through the valve 10. Specifically, they are the ball 37 dropping onto the seat 38 due to the mere weight of the said ball, the line fluid pressure acting on the said ball, and the closure actuator member 31 pressuring downwardly on the said ball to hold the latter member to its seat at 38. Thus, a simple and effective means has been discovered to control liquid flow through the valve 10.

A modification of the valve 10 is shown in Figs. 5, 6, and 7, where essentially the same operating principle is applied but with a substantially different closure actuating construction. A fluid tight valve casing 41 is shown having an inlet 42 and the outlet 43 and therebetween a communicating circular recess or chamber 44. The hole 45 in the stem 46 receives the lever 17. The said stem extends in the manner previously described with the other figures through one side of the casing 41. However, it differs from the structure described in the previous figures in that the instant stem is concentric with the recess 44. On the opposite side, the casing 41 receives the removable cover 26 and the gasket 25 positioned therebetween in the manner similarly described in connection with Fig. 3. In this modification, the closure member holder 47 consists of spread apart oppositely disposed forked portions 48, the holder being mounted non-rotatably relative to the stem 46 within the circular chamber 44. Here, the construction of the holder 47, as best shown in Fig. 7, provides the necessary actuation and control over a closure ball member 49, which is freely disposed between the depending prongs 48 of the holder 47. As illustrated, the ball 49 is operable on a valve outlet seat 51 in the manner previously described. However, in this construction, a relatively loosely fitting pin 52 extends through an opening in the center of the fork 47 to be reciprocably movable therein. After suitable rotation, the pin 52 is forced downwardly onto the ball 49 to maintain a constant contact therewith by providing for the end 53 of the pin sliding on an inclined cam-like guide 54. The latter member is retained within the recess 44 above the pin 52 as the lever 17 imparts counterclockwise rotation to the fork 47 in Fig. 5. Thus, the pin 52, as shown more clearly in the latter figure, serves to hold the ball 49 against the seat 51 to accomplish the same positive seating as described in connection with Fig. 2.

Still a further modification of valve 10 is shown in Figs. 8 and 9. Here, the circular fluid tight casing 56 contains a circular recess 57 and valve inlet 58 and outlet 59 openings. As shown more clearly in Fig. 9, a casing cover 61 is threadedly applied to the casing 56 to form a fluid tight seal with a gasket 62 therebetween. The casing 56 is provided with a threaded opening 63 for receiving an elbow fitting 64 serving as the inlet therefor. The actuating stem 66 is connected to the lever 17 by the hole 60 which receives the latter member. Said stem extends through the casing 56 and is relatively non-rotatably connected to the substantially circular closure member holder 67 which is rotatable therewith within the recess 57. A lug 65 projecting from the casing 56 into the casing recess or chamber 57 is received by a groove 70 provided in the periphery of the holder member 67, thereby retaining the latter member to the casing 56. A cutaway portion 68 in the periphery of the holder member 67 is used in the same manner as described in connection with the other figures to receive the closure ball member 69 which, as indicated, is relatively freely disposed therein. Around the same periphery, another cutout portion 71 provided in the holder member 67 allows for continuous fluid flow through the valve 10 in the open position. And an opening 73 in the partition between the said two cutouts provides for flow past the said partition. In this modified form, the ball 69, operable on the outlet seat 72, is forced onto the said seat by its abutment with the predeterminately formed cam-like surface of the cutout portion 68 upon the counterclockwise rotation of the holder member 67, as illustrated in Fig. 8. The seat 72 is preferably slightly tapered to provide for the best utilization of the downwardly applied force on the ball 69 in the manner just described.

In three of the aforementioned embodiments of the valve 10, it could be provided that the said closure member holders be completely retained by the said respective closure members, thereby permitting the desired free movement of the said latter member and withdrawing the said closure members from actual contact with the arcuate surface which forms the wall of the said casing chambers.

A still further modification of the valve 10 is shown in Fig. 10 where the general structure is substantially the same as that shown and described in connection with Figs. 2 and 3. In the instant form, the closed position of the valve 10 is shown in full lines in Fig. 10, while the open position of the valve is indicated in dotted lines.

The closure member holder 74 is preferably pressed into a slot 76 in the end of the stem 77 to effect a relatively non-rotatable firm connection therebetween. Of course, it could be made integral therewith, if desired. The closure ball member 78 is relatively loosely connected to the member 74 by means of a screw 79 loosely engaging the extension of holder 74 by its projection through the enlarged hole 81 in the member 74. The lower end of the screw is threaded into the ball 78 to complete the assembly.

Operation of the presently described modification of said valve is obtained by counterclockwise rotation of the holder member 74, the lever 17 then being in the position shown in solid lines. Such rotation positions the ball 78 on the seat 80 in relation to the outlet opening 82, thereby controlling liquid flow through the valve 10. It will be apparent that the loose connection between the ball 78 and the holder 74 permits a limited and desirable amount of self-seating of the ball 78 under line fluid pressure. An increased upward force on the lever 17 by continued counterclockwise movements as previously described will positively seat the ball 78 within the outlet 82 because there will then come into action a downward force produced through the end extension of the holder member 74 applied to the ball 78. As shown in the dotted lines, a clockwise motion will unseat the ball 78. It should be understood, of course, that a spherical closure member, such as the ball 78, is not necessary in this modification, but plain, flat, or inclined seat contacts may be used instead with satisfactory results, depending upon the nature of the service encountered.

Although this invention has been described in certain forms, it is not to be so limited, but it is susceptible to structural changes without departing from the spirit thereof as defined by the scope of the appended claims.

We claim:

1. A valve comprising a substantially fluid tight casing having fluid inlet and outlet openings therethrough, a rotatable stem extending into the said casing, means for rotating the said stem, a closure member holder non-rotatably mounted on the said stem within the said casing and having two extending end portions spaced apart, a spherical closure member limitedly restricted in movement by the said closure member holder end portions thereby to selectively interrupt fluid flow through the said valve by the combined seating in the outlet opening of the casing under line-fluid pressure and with a force exerted by the said closure member holder having one of said end portions of the said holder abut against the said closure member in a maximum rotative position of the said holder, the other end portion of said holder serving to unseat the said closure member and maintain it unseated.

2. A valve comprising a substantially fluid tight casing having fluid inlet and outlet openings therethrough, a rotatable stem extending into the said casing, means for rotating the said stem, a closure member holder non-rotatably mounted on the said stem within the said casing and having two extending end portions spaced apart, a spherical closure member limitedly restricted in movement by the said closure member holder end portions thereby to selectively interrupt fluid flow through the said valve by the combined seating in the outlet opening of the casing under line-fluid pressure and with a force exerted by the said closure member holder having one of said end portions of the said holder abut against the said closure member in a maximum rotative position of the said holder, the other end portion of said holder serving to unseat the said closure member and maintain it unseated, at least one of the end portions of the said holder being bifurcated whereby to guide and center the spherical closure member in the course of its movement during said selective interruption of the fluid flow through the valve.

3. A valve comprising a substantially fluid tight casing having fluid inlet and outlet openings therethrough, a rotatable stem extending into the said casing, means for rotating the said stem, a closure member holder non-rotatably mounted on the said stem within the said casing and having two extending end portions spaced apart, a spherical closure member limitedly restricted in movement by the said closure member holder end portions thereby to selectively interrupt fluid flow through the said valve by the combined seating in the outlet opening of the casing under line-fluid pressure and with a force exerted by the said closure member holder having one of said end portions of the said holder abut against the said closure member in a maximum rotative position of the said holder, the other end portion of said holder being of a length sufficient to extend substantially to the inner limits of the said casing outlet opening whereby to contact the said spherical closure member substantially below its center and adjacent said outlet opening thus serving upon predetermined movement to unseat the said closure member and maintain it in unseated position.

4. A valve comprising a substantially fluid tight casing having fluid inlet and outlet openings therethrough, a rotatable stem extending into the said casing, means for rotating the said stem, a closure member holder non-rotatably mounted on the said stem within the said casing and having two extending end portions spaced apart, the said closure member holder comprising a relatively thin strip of substantially U-form fitted over an end portion of said stem, a spherical closure member receivable between the end portions of the U-formed holder and being limitedly restricted in movement by the said closure member holder end portions thereby to selectively interrupt fluid flow through the said valve by the combined seating in the outlet opening of the casing under line-fluid pressure and with a force exerted by the said closure member holder having one of said end portions of the said holder abut against the said closure member in a maximum rotative position of the said holder, the other end portion of said holder being bifurcated to receive the spherical closure member and serving to unseat the said closure member and maintain it unseated upon predetermined pivotal movement of the said holder.

JULIUS A. HJULIAN.
FRANK D. COTTERMAN.
GEORGE E. HANSEN.

References Cited in the file of this patent

UNITED STATES PATENTS

| Number | Name | Date |
|---|---|---|
| 618,188 | Rogers | Jan. 24, 1899 |
| 994,268 | Milne | June 6, 1911 |
| 1,171,189 | Grandi | Feb. 8, 1916 |
| 1,684,905 | Bastian | Sept. 18, 1928 |
| 1,693,676 | Spinelle | Dec. 4, 1928 |
| 2,196,503 | McFee | Apr. 9, 1940 |

FOREIGN PATENTS

| Number | Country | Date |
|---|---|---|
| 26,346 | Great Britain | of 1913 |